United States Patent [19]
Tisack

[11] Patent Number: 5,736,078
[45] Date of Patent: Apr. 7, 1998

[54] METHOD FOR MANUFACTURING UNCOATED VINYL COVERING

[75] Inventor: Michael Derek Tisack, Ann Arbor, Mich.

[73] Assignee: Ford Motor Company, Dearborn, Mich.

[21] Appl. No.: 785,046

[22] Filed: Jan. 17, 1997

[51] Int. Cl.$^6$ ............................................. C11D 10/00
[52] U.S. Cl. ................. 264/39; 264/309; 252/117; 252/545; 252/546; 252/548
[58] Field of Search .............. 264/309, 39; 252/117, 252/545, 546, 548

[56] References Cited

U.S. PATENT DOCUMENTS

| | | | |
|---|---|---|---|
| 3,927,161 | 12/1975 | Powell et al. | 264/46.6 |
| 4,486,329 | 12/1984 | Ellis et al. | 252/117 |
| 4,552,715 | 11/1985 | Ando et al. | 264/309 |

*Primary Examiner*—Laurie Scheiner
*Attorney, Agent, or Firm*—Damian Porcari

[57] ABSTRACT

A method of manufacturing an uncoated covering for an automotive instrument panel. The method comprises the steps of providing an electroplated nickel tool having a grained surface. A quantity of melt fusible powered vinyl is dispensed within the tool. The tool is heated to melt the vinyl and to form the covering. The vinyl leaves deposits on the tool surface. The vinyl covering is cooled and removed from the tool. The tool is periodically cleaned with an aqueous solution of 14% by weight glycol ether DPM and 4% by weight triethanolamine to remove the unwanted deposits before they can mar the finish on the vinyl covering.

12 Claims, No Drawings

METHOD FOR MANUFACTURING UNCOATED VINYL COVERING

BACKGROUND OF THE INVENTION

1. Field of the Invention

The present invention relates to a method of manufacturing a soft plastic covering for use in an automotive instrument panel. More specifically, the invention relates to a method of manufacturing a covering without a coating by periodically cleaning a mold to avoid unwanted deposits adhering to the mold surfaces.

2. Description of the Related Art

It is known to manufacture automotive instrument panel covers by a process of molding a covering from a synthetic resin powder. The process is generally referred to as "slush molding" and/or "roto-casting." One example of an instrument panel covering made by this process is taught in U.S. Pat. No. 3,927,161. A fluidized bed of fine vinyl plastic resin particles are dispensed into a mold. The mold is heated to cause the vinyl particles to melt and to conform to the shape of the mold surface. The mold is cooled and the covering removed. It is customary to add features lines resembling the graining of leather onto the mold surface to impart a "leather like" appearance to the covering. After each molding operation, remnants from the resin powder composition are deposited atop the mold surface. These deposits include light stabilizers (to prevent degradation from exposure to ultraviolet radiation), heat stabilizers (to prevent degradation in extreme high temperature conditions), plasticizers, internal mold release compounds, and by-products of resin degradation. A build-up of these deposits cause subsequently molded coverings to have a blotchy or shiny appearance in the areas of heaviest deposit build up. It is customary to coat the coverings with a low gloss clear-coating to provide an uniform matte finish to the covering and to cancel the shiny areas. Every covering would be clear coated even though only some had the blotchy appearance because it was difficult to anticipate when the effects of the build-up would become noticeable on the skins.

The deposits can build up in the mold surface to such a great extent, that the graining in the covering becomes effected. The small pockets within the tool surface that impart graining become filled with deposits and the vinyl covering loses its grained texture. Heretofore, these tools were cleaned every several thousand cycles with either an acid wash or grit blasting. Both the acid wash and the grit blasting damaged the tools and the delicate features that imparted the grained surface texture. Further, the grit blasting required extensive cleaning to remove all traces of grit so as not to contaminate subsequent molding cycles. The acid wash required neutralization and is generally harmful to the tooling. Typically, the invasive nature of these treatments would so damage the mold surface that skins cast from these tools could only be utilized if clear-coated.

It is desirable to provide for a method of fabricating a molded covering for an instrument panel that does not require the clear-coat application. It is further desired to provide a method for cleaning powder slush tooling that does not degrade or damage the grained surface. These and other features, advantages and objects of the present invention will become more apparent to those of ordinary skills in the art upon reference to the following description.

SUMMARY OF THE INVENTION

The present invention relates to a method of manufacturing an uncoated covering for an automotive instrument panel. The method comprises the steps of providing an electroplated nickel shell tool having a grained surface. A quantity of melt fusible powdered vinyl is dispensed within the tool. The tool is heated to melt the vinyl and to form the cover. The vinyl leaves deposits on the tool surface. The vinyl covering is cooled and removed from the tool. The tool is periodically cleaned with an chemical solution to remove the unwanted deposits before they can mar the finish on the vinyl covering.

The solution most useful in cleaning the tool when used with the vinyl powdered stock is an aqueous solution consisting of 14% by weight glycol ether DPM and 4% by weight triethanolamine. Tools used to manufacture automotive instrument panels from powdered vinyl need to be cleaned after approximately 500 cycles.

DETAILED DESCRIPTION OF THE PREFERRED EMBODIMENTS

The present invention is practiced using conventional powdered slush molding or roto-cast tooling. The tooling is manufactured by electroplating nickel over a mandrel. The interior surface of the tooling is provided with small pockets or indentations that impart a grained texture to the covering. Very fine ridges on the tool surface form grooves on the covering. A quantity of powdered drysol (PVC powder which has been shear mixed such that it has absorbed the appropriate compounds such as UV and oxidation inhibitors, plasticizers, and mold releases required and has become a dry powder) is dispensed within the tool. The tool is heated to temperatures exceeding 400° F. The covering is formed in a conventional fashion by melting the powdered vinyl and rotating the tool so that the vinyl evenly coats the tool surface. The covering is allowed to cool and then removed from the tool.

Each molding operation cycle causes a small quantity of residue to be deposited atop the tool surface. This residue includes UV light and heat stabilizers, plasticizers, internal mold releases, and by-products of resin degradation.

These types of residue have been found to be soluble in certain aqueous solutions. Once such suitable solution consists of 14% by weight glycol ether DPM and 4% by weight triethanolamine in water. The solution is sprayed or poured onto the tool surface at low pressure through a tool cover which seals the tool against outward leakage of the cleaning solution. The tool is heated to approximately 120° F. and rotated to ensure uniform contact of the solution with all mold surfaces. The deposits are solvated by the cleaning solution and dissolved into the solution. The spent cleaning solution is pumped out of the tool and collected. Approximately 15 to 20 gallons of cleaning solution are needed for each cleaning cycle. The tool surface is then rinsed twice with deionized water to ensure complete removal of cleaning solution and contaminants. After the rinsing process, the tool cover is removed, and the tool is heated to a temperature of approximately 300° F. to evaporate the remaining deionized water residue.

It should be emphasized that the present invention is not limited to any particular components, material or configurations described and that modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes presented herein. All alternative modifications and variations of the present which fall within the spirit and broad scope of the appending claims are included.

What is claimed:

1. A method of manufacturing an uncoated covering having a finished surface that displays a uniform appearance for an automotive instrument panel comprising the steps of:

providing an electroplated nickel tool having a grained surface;

dispensing a quantity of melt fusible powdered vinyl into said tool;

heating said tool to melt said vinyl and to form said covering, said vinyl leaving deposits that adhere to said surface;

removing said vinyl covering from said tool; and periodically cleaning said surface with a cleaning solution of glycol ether DPM and triethanolame to remove said deposits, said cleaning solution removing said deposits without damaging said tool.

2. The method of claim 1, wherein said cleaning solution an aqueous solution consisting of 14% by weight glycol ether DPM and 4% by weight triethanolamine.

3. The method of claim 1, wherein said period between cleanings is 500 cycles.

4. The method of claim 1, further comprising heating said cleaning solution within said tool.

5. The method of claim 1, further comprising spraying said cleaning solution onto the tool surface at low pressure through a tool cover which seals the tool against outward leakage of said cleaning solution.

6. The method of claim 1, further comprising rotating said tool to ensure uniform contact of said cleaning solution with said surface.

7. The method of claim 1, further comprising solvating said deposits by said cleaning solution.

8. The method of claim 1, further comprising pumping out said cleaning solution from said tool.

9. The method of claim 1, further comprising rinsing said surface with deionized water to ensure complete removal of said cleaning solution and said deposits.

10. The method of claim 5, further comprising removing said tool cover.

11. The method of claim 9, further comprising heating said tool to a temperature sufficient to evaporate the remaining deionized water residue.

12. A method of manufacturing an uncoated covering having a finished surface that displays a uniform appearance for an automotive instrument panel comprising of:

providing an electroplated nickel tool having a grained surface;

spraying at low pressure a quantity of melt fusible powdered vinyl into said tool;

heating said tool to melt said vinyl and to form said covering, said vinyl leaving deposits that adhere to said surface;

removing said vinyl covering from said tool;

cleaning said surface after 500 dispensing cycles;

applying a tool cover against said tool;

spraying at low pressure a heated aqueous cleaning solution of 14% by weight glycol ether DPM and 4% by weight triethanolamine onto said surface to solvate said deposits in said cleaning solution;

rotating said tool to ensure uniform contact of said cleaning solution with said surface;

pumping out said cleaning solution from said tool;

rinsing said surface with deionized water to ensure complete removal of said cleaning solution and said deposits;

removing said tool cover; and heating said tool to a temperature sufficient to evaporate the remaining deionized water residue.

* * * * *